(12) United States Patent
Xia et al.

(10) Patent No.: US 11,286,595 B2
(45) Date of Patent: Mar. 29, 2022

(54) CONTROL METHOD OF PATTERN LOADING FOR HIGH SPEED DOUBLE NEEDLE BAR WARP KNITTING MACHINE

(71) Applicant: Jiangnan University, Wuxi (CN)

(72) Inventors: Fenglin Xia, Wuxi (CN); Gaoming Jiang, Wuxi (CN); Qi Zhang, Wuxi (CN); Aijun Zhang, Wuxi (CN); Baoping Zheng, Wuxi (CN); Ailan Wan, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 17/213,327

(22) Filed: Mar. 26, 2021

(65) Prior Publication Data
US 2021/0214867 A1    Jul. 15, 2021

Related U.S. Application Data

(63) Continuation of application No. PCT/CN2020/071155, filed on Jan. 9, 2020.

(30) Foreign Application Priority Data

Mar. 12, 2019   (CN) .......................... 201910184515.4

(51) Int. Cl.
   *D04B 37/06*   (2006.01)
   *D04B 23/02*   (2006.01)
   *D04B 27/08*   (2006.01)

(52) U.S. Cl.
   CPC .............. *D04B 37/06* (2013.01); *D04B 23/02* (2013.01); *D04B 27/08* (2013.01); *G05B 2219/45194* (2013.01)

(58) Field of Classification Search
   CPC ............................................ G05B 2219/45194
   USPC ......................................................... 700/141
   See application file for complete search history.

(56) References Cited

U.S. PATENT DOCUMENTS

| 3,555,853 | A | * | 1/1971 | Diehl et al. | ............ D04B 27/26 66/87 |
| 3,820,082 | A | * | 6/1974 | Bauknecht | ............. G11C 19/00 700/141 |
| 3,842,625 | A |   | 10/1974 | Apken et al. | |
| 3,858,415 | A | * | 1/1975 | Wilson | ................... D04B 27/22 66/210 |

(Continued)

FOREIGN PATENT DOCUMENTS

| CN | 1091485 A | 8/1994 |
| CN | 2758296 Y | 2/2006 |

(Continued)

*Primary Examiner* — Khoa D Huynh
*Assistant Examiner* — Grace Huang
(74) *Attorney, Agent, or Firm* — IPro, PLLC

(57) ABSTRACT

The disclosure discloses a control method of pattern loading for a high speed double needle bar warp knitting machine. Through disposing two or more than two high speed FIFO pattern data cache regions on a shog controller, a data read-write conversion function of each cache region continuously and automatically is respectively realized. Needle collision caused by guide bar shogging during pattern loading is avoided. Pattern loading steps of the double needle bar warp knitting machine are simplified; the work intensity is reduced; and the work reliability is improved.

7 Claims, 3 Drawing Sheets

(56) References Cited

U.S. PATENT DOCUMENTS

| | | | | |
|---|---|---|---|---|
| 3,864,944 A * | 2/1975 | Jackson | D04B 23/02 | 66/87 |
| 3,950,942 A * | 4/1976 | Namura | D04B 27/08 | 66/205 |
| 4,309,880 A * | 1/1982 | Riesen | D04B 27/26 | 474/166 |
| 4,458,508 A * | 7/1984 | Englert | D04B 27/26 | 66/207 |
| 4,608,642 A * | 8/1986 | Shima | G05B 19/14 | 700/141 |
| 5,311,752 A * | 5/1994 | Gille | D04B 27/26 | 66/207 |
| 5,375,435 A * | 12/1994 | Gille | D04B 27/34 | 66/211 |
| 5,628,210 A * | 5/1997 | Mista | D04B 21/06 | 66/203 |
| 5,912,816 A * | 6/1999 | Emery | D04B 37/00 | 700/143 |
| 5,956,978 A * | 9/1999 | Dorn | D04B 27/26 | 66/207 |
| 6,253,583 B1 * | 7/2001 | Brandl | D04B 23/24 | 66/204 |
| 7,127,321 B2 * | 10/2006 | Kenji | D04B 1/24 | 700/141 |
| 7,289,869 B2 * | 10/2007 | Morita | D04B 15/48 | 66/125 R |
| 7,320,233 B2 * | 1/2008 | Lonati | D04B 27/26 | 66/207 |
| 7,363,101 B2 * | 4/2008 | Nishitani | D04B 15/48 | 66/126 R |
| 7,727,519 B2 * | 6/2010 | Moran | A61P 31/00 | 424/85.4 |
| 7,913,521 B2 * | 3/2011 | Lonati | D04B 27/32 | 66/205 |
| 10,077,514 B2 * | 9/2018 | Jiang | D04B 27/08 | |

FOREIGN PATENT DOCUMENTS

| | | | | |
|---|---|---|---|---|
| CN | 101619525 A | | 1/2010 | |
| CN | 204875051 U | | 12/2015 | |
| CN | 105624909 A | | 6/2016 | |
| CN | 109736007 A | | 5/2019 | |
| EP | 1498529 A1 * | | 1/2005 | D04B 27/08 |

* cited by examiner

CONTROL METHOD OF PATTERN LOADING FOR HIGH SPEED DOUBLE NEEDLE BAR WARP KNITTING MACHINE

TECHNICAL FIELD

The disclosure relates to a control method of pattern loading for a high speed double needle bar warp knitting machine, and belongs to the technical field of warping knitting equipment.

BACKGROUND

A knitting movement mode of a double needle bar warp knitting machine is in two types: an ordinary type and a high speed type. In a knitting action of an ordinary type double needle bar warp knitting machine, the front needle bar and the rear needle bar alternately ascend, i.e., in a whole process that the front needle bar performs ascending and clearing, yarn laying, descending and closing, and knocking-over, the rear needle bar is always in the lowest position. And in a whole process that the rear needle bar ascends and descends to loop, the front needle bar is always in the lowest position; and when both the front needle bar and the rear needle bar are in a knocking-over period of the low position, loading a novel pattern can be performed so that shog driving execution units in forms of guide bar shogging servo, stepper and the like control guide bars to transversely move to a starting position of a novel pattern, and no needle collision during shogging of the guide bars. Furthermore, there is neither yarn breakage nor needle damage caused by laying into the needle hook by guide needles when guide bar shogging, so that the machine can put into production directly after finishing loading a novel pattern.

In a knitting cycle of the high speed double needle bar warp knitting machine, the front needle bar and the rear needle bar alternately descend, i.e., in a whole cycle that the front needle bar performs descending and closing, knocking-over, and then ascending and clearing, the rear needle bar is always in the highest position for overlapping to feed yarn. Identically, in a whole knitting cycle that the rear needle bar descends and then ascends, the front needle bar is always in the highest overlapping position. Additionally, in a knitting cycle, the guide bars (and guide needles thereon) only perform once forward and backward reciprocating swinging to complete lapping movement, i.e., in any knitting period, at least one of the front or rear needle bar is in the highest position. In any knitting period, the guide bars (and guide needles thereon) are in overlapping position of the needle bar at a high position (to perform overlapping), or there are some guide needles located at least at the gap of the knitting needles in the highest position, as shown in FIGS. 1(1)-(10). During loading a novel pattern, when the shog driving execution units drive the guide bars to transversely move to the starting position of the novel pattern, needle collision between the guide needle and the knitting needle may be caused, or yarns may be excessively laid into the needle hook to cause yarn breakage and/or needle damage, so that there is no control method which can support moving the guide bars directly to its starting position of the novel pattern when loading a novel pattern at any knitting period.

Methods and steps in common use at present during novel pattern loading on the high speed double needle bar warp knitting machine are as follows: (1) stop the machine when the front needle bar of the double needle bar warp knitting machine is operated to reach the lowest position by inching machine; (2) dismount a connecting rod or other components in a transmission mechanism of the rear needle bar (in the highest position at this moment), i.e., disconnecting the transmission mechanism of the rear needle bar, pushing and pulling the rear needle bar to a lower position to enable the yarns on the guide needles not to be laid into the needle hook of the rear needle bar knitting needle; (3) load a novel pattern, then the guide bars are driven to shog to the position of the first course of the novel pattern by the shog driving units; (4) inch the machine (or by manual) to let the front needle bar ascend to the highest position, and stop the machine when all of the guide bars (and guide needles thereon) swing to the hook side of the front needle bar; and (5) reconnect the dismounted and disconnected transmission mechanism of the rear needle bar (at the moment, the rear needle bar should be at or near the lowest position), and finish the novel pattern loading. In this method, an easy-to-dismount auxiliary device must be added to the transmission mechanism of the rear needle bar of the double needle bar warp knitting machine, so that the operation of pulling the rear needle bar to the lowest position can be easy and simplified, and the novel pattern loading is convenient.

During the whole process of loading novel pattern according to the mentioned method, yarns may have already existed on the guide needle, or the original yarn has been sheared away due to the need of changing. The guide bars with yarns, the original yarn or the replaced new yarn, should be placed on the machine already between the step (3) and the step (4), so as to ensure that the guide needles with the yarns can pass through exact gaps to swing from the needle back side to its hook side of the front needle bar without any yarn breakage or needle damage caused by excessive overlapping. Therefore, this kind of method is very complicated in operation during loading the pattern of the double needle bar warp knitting machine, the transmission mechanism of the rear needle bar needs to be frequently dismounted, the operation difficulty of loading the novel pattern of the double needle bar warp knitting machine and the work intensity are greatly increased, the operation convenience of the double needle bar warp knitting machine is seriously influenced, and the production efficiency of the warp knitting machine is reduced. However, the pattern loading method for the ordinary double needle bar warp knitting machine is unsuitable for the high speed double needle bar warp knitting machines, because at least one needle bar of the high speed double needle bar warp knitting machine is in the highest position. It may cause collision between the guide needle and the knitting needle during loading the pattern, or the novel pattern loading cannot be performed because the guide needles is at the overlapping position of a certain needle bar where cannot allow to load the pattern.

SUMMARY

In order to solve the problems that in the prior technique, the operation is very complicated during pattern loading of a double needle bar warp knitting machine, a transmission mechanism of the rear needle bar needs to be frequently dismounted, and the operation difficulty of novel pattern loading of the double needle bar warp knitting machine and the work intensity are greatly increased, the disclosure provides a control method of pattern loading for a high speed double needle bar warp knitting machine. Firstly, according to its current position of each guide bar, its target position of current shogging of an original pattern and its starting course position of a novel pattern, the control system automatically calculates a shogging displacement required of each guide bar in a pattern loading process, and sends out instruction information to a shog driving execution unit corresponding to each guide bar, then the corresponding guide bar is respectively driven by the shog driving execution unit to move precisely to the starting course position of the novel pattern to complete the novel pattern loading when every guide bar is at its underlapping position. Problems such as needle collision, yarn breakage and needle damage possibly caused by shogging during pattern loading are avoided. The pattern loading process of the double needle bar warp knitting machine are simplified with reducing the work intensity and improving the work reliability.

A first objective of the disclosure is to provide a control system which can realize fast pattern loading on a high speed double needle bar warp knitting machine. The control system includes a shog controller. The shog controller at least includes two data cache regions. Additionally, the shog controller is able to realize a data read-write conversion function of each cache region continuously and automatically.

When the control system carries out novel pattern loading, shogging plan data of a novel pattern is calculated according to machine main cam-shaft position information and the novel pattern data to be loaded, and the shogging plan data of the novel pattern includes data of a resetting curve required during novel pattern loading and a shogging curve of the novel pattern.

The shog controller loads the novel pattern: the shogging plan data of the novel pattern is respectively written into the at least two data cache regions included in the shog controller.

The shog controller sends out a shogging instruction to shog driving execution units of each guide bar on the warp knitting machine according to the shogging plan data in the data cache regions, so as to realize knitting continuously during novel pattern loading.

A second objective of the disclosure is to provide a control method of pattern loading for a high speed double needle bar warp knitting machine. The method is applied to realizing fast pattern loading on the control system of a high speed double needle bar warp knitting machine, and includes:

calculating shogging plan data of a novel pattern according to machine main cam-shaft position information and novel pattern data to be loaded, wherein the shogging plan data of the novel pattern includes data of a resetting curve required during novel pattern loading and a shogging curve of the novel pattern;

loading the novel pattern by the shog controller: respectively writing the shogging plan data of the novel pattern into at least two data cache regions included in the shog controller; and sending out a shogging instruction by the shog controller to shog driving execution units of each guide bar on the warp knitting machine according to the shogging plan data in the data cache regions, so as to realize knitting continuously during novel pattern loading.

Optionally, the operation of calculating the shogging plan data of the novel pattern according to the machine main cam-shaft position information and the novel pattern data to be loaded is completed by a warp knitting machine control computer, the warp knitting machine control computer calculates to obtain the shogging plan data of the novel pattern, and then sends the shogging plan data of the novel pattern to the shog controller, and the shog controller loads the novel pattern, including:

optionally, writing, by the shog controller, the data of the resetting curve required during novel pattern loading into one cache region of the shog controller, and writing the data of the shogging curve of the novel pattern into the other cache region of the shog controller.

The operation of calculating the shogging plan data of the novel pattern according to the machine main cam-shaft position information and the novel pattern data to be loaded is completed by the shog controller, and includes:

reading the machine main cam-shaft position information by the shog controller, wherein the main cam-shaft position information includes a current position of each guide bar;

sending the novel pattern data by the control system of the warp knitting machine to the shog controller, wherein the novel pattern data includes a starting course position of the novel pattern;

reading a target position of current shogging of an original pattern by the shog controller;

calculating, by the shog controller, a shogging parameter required of each guide bar to shog to a novel pattern starting position according to the current position of each guide bar, the target position of current shogging of the original pattern and the starting course position of the novel pattern, and generating a resetting curve during novel pattern loading according to a lapping interval allowed given by the control system of the warp knitting machine and the shogging rule, and then, writing the data of the resetting curve into one cache region of the shog controller; and calculating the data of the shogging curve of the novel pattern by the shog controller according to the novel pattern data, and writing the data into the other cache region of the shog controller.

Optionally, the operation of writing the data of the shogging curve of the novel pattern into the other cache region of the shog controller includes: comparing a total courses m of the novel pattern and a pattern courses k capable of being written into the other cache region of the shog controller at one time;

if m≤k, writing the data of the shogging curve generated from the whole novel pattern data into the other cache region of the shog controller at one time; and if m>k, segmenting the whole pattern data, and writing the data of the shogging curve generated from first-segment pattern data into the other cache region of the shog controller.

Optionally, the operation of segmenting the shogging curve of the pattern includes: segmenting the whole pattern data according to its total courses of pattern height corresponding to the courses of each segment being k, and enabling the courses of the final segment to be ≤k.

Optionally, when m>k, if the shog controller only includes two data cache regions, after the data of the resetting curve in one cache region of the shog controller is read, the data of the shogging curve generated from the rest of the segments of pattern data is written into the cache region, and writing is performed cyclically on the two cache regions until all of the data of the shogging curve generated from all of the pattern data is written into the cache region; and if the shog controller includes more than two data cache regions, the data of the shogging curve generated from the rest of the segments of pattern data are directly written into cache regions other than the first two cache regions; if these cache regions other than the first two cache regions are incapable of accommodating all of the data, then after the data written in each of all the data cache regions is read, the data of the shogging curve generated from the rest of the segments of pattern data is sequentially written into all the data cache regions. This process is repeated until all of the data are written into all the data cache regions.

Optionally, before the shog controller reads the machine main cam-shaft position information, the method further includes:

inputting a novel pattern file into the control system of the warp knitting machine, and performing process inspection on the novel pattern file.

Optionally, after the shog controller reads the machine main cam-shaft position information and before the control system of the warp knitting machine sends the novel pattern data to the shog controller, the method further includes:

judging whether a position of the main cam-shaft of the high speed double needle bar warp knitting machine is located in a pattern loadable position or not; and if a judging result shows that the position of the main cam-shaft is suitable for loading novel pattern, continuing subsequent steps; and if the judging result shows that the position of the main cam-shaft is unsuitable for loading novel pattern, the control system of the warp knitting machine will remind an operator to inch the machine.

A third objective of the disclosure is to provide application of the control system of the high speed double needle bar warp knitting machine realizing fast pattern loading and/or the control method of pattern loading for the high speed double needle bar warp knitting machine to the technical field of warp knitting equipment.

The disclosure has the following beneficial effects:

Through disposing two or more than two high speed FIFO pattern data cache regions on the shog controller of the control system of the double needle bar warp knitting machine, a data read-write conversion function of each cache region continuously and automatically is respectively realized. According to the current position of each guide bar and the target position of the starting course of the novel pattern, the shog controller automatically calculates the shogging displacement required by each guide bar during the pattern loading by the control system of the double needle bar warp knitting machine, and sends out instruction information to the shog driving execution unit corresponding to each guide bar. In the respective underlapping interval allowed of each guide bar, the corresponding guide bar is respectively driven by the shog driving execution unit to respectively and precisely move to the starting course position of the novel pattern to complete the electronic shogging pattern loading. Needle collision caused by guide bar shogging during pattern loading is avoided. Pattern loading steps of the double needle bar warp knitting machine are simplified; the work intensity is reduced; and the work reliability is improved.

BRIEF DESCRIPTION OF FIGURES

In order to more clearly illustrate the technical schemes of the examples of the disclosure, the accompanying drawings used in the description of the examples are briefly described below. It is obvious that the accompanying drawings in the following description are only some examples of the disclosure, and other accompanying drawings can be obtained by those skilled in the technique based on these accompanying drawings without any creative effort.

DETAILED DESCRIPTION

In order to make the objectives, technical schemes and advantages of the disclosure clearer, the examples of the disclosure will be further described in detail below with reference to the accompanying drawings.

Example 1

The present example provides a control system of a high speed double needle bar warp knitting machine realizing fast pattern loading. The control system includes a shog controller. The shog controller at least includes two data cache regions, and additionally, the shog controller is able to realize a data read-write conversion function of each cache region continuously and automatically. When the control system carries out novel pattern loading, shogging plan data of a novel pattern is calculated according to machine main cam-shaft position information and novel pattern data to be loaded, and the shogging plan data of the novel pattern includes data of a resetting curve required during novel pattern loading and a shogging curve of the novel pattern.

The shog controller loads the novel pattern: the shogging plan data of the novel pattern is respectively written into the at least two data cache regions included in the shog controller.

The shog controller sends out a motion instruction to shog driving execution units of the warp knitting machine according to the shogging plan data in the data cache regions, so as to realize knitting continuously during novel pattern loading.

According to a current position of each guide bar and a target position of a starting course of the novel pattern, the shog controller automatically calculates the shogging displacement required by each guide bar in the pattern loading process by the control system of the double needle bar warp knitting machine, and sends out instruction information to the shog driving execution unit corresponding to each guide bar. In the respective underlapping interval allowed of each guide bar, the corresponding guide bar is respectively driven by the shog driving execution unit to respectively and precisely move to the starting course position of the novel pattern to complete the electronic shogging pattern loading. Needle collision caused by guide bar shogging during pattern loading is avoided. Pattern loading steps of the double needle bar warp knitting machine are simplified; the work intensity is reduced; and the work reliability is improved.

Example 2

Figure 2:
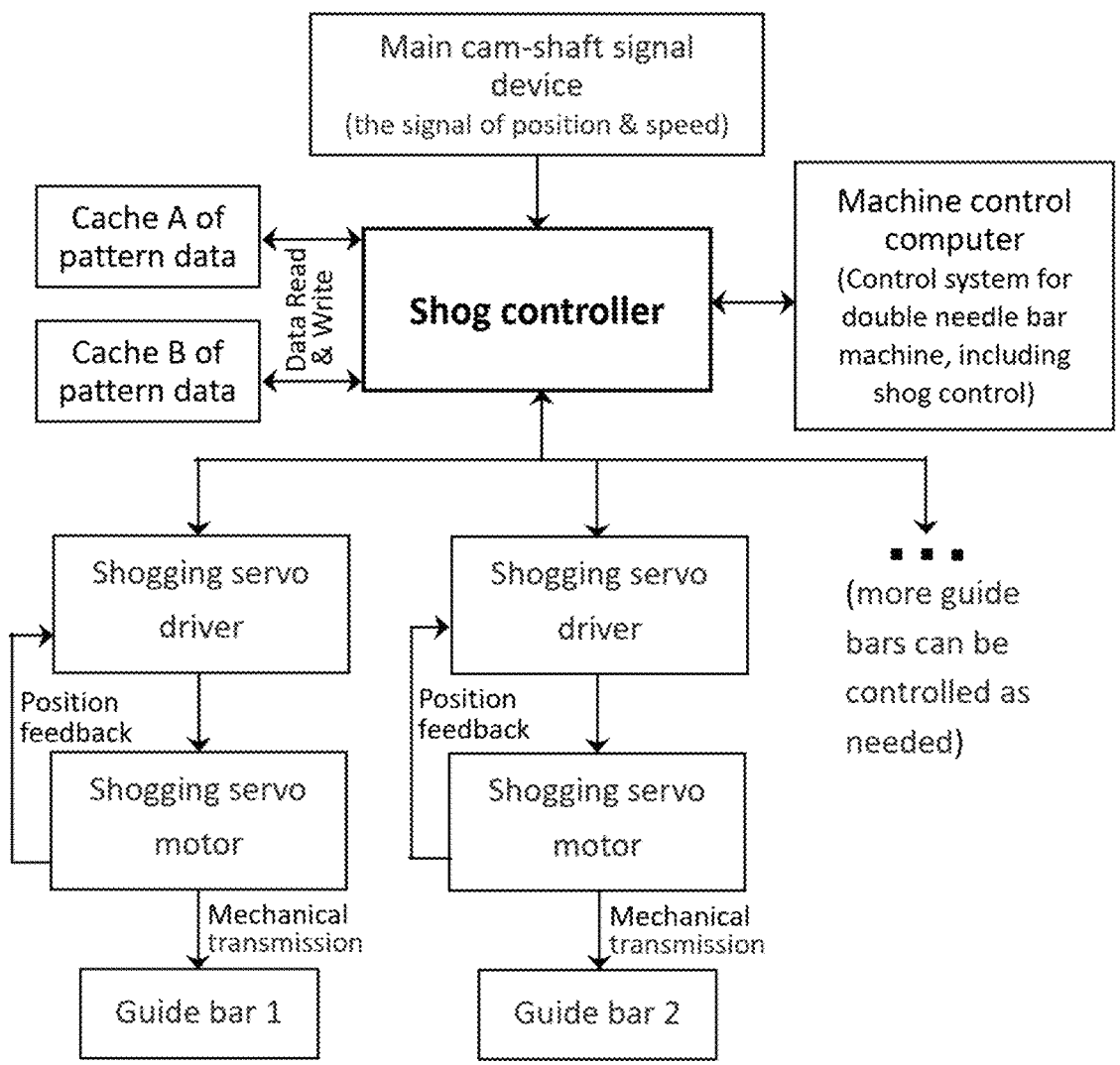
FIG. 2 is a schematic structure diagram of a shogging control system of a double needle bar warp knitting machine.

The present example provides a control method of pattern loading for a high speed double needle bar warp knitting machine. The method is applied to a high speed double needle bar warp knitting machine with the control system of the high speed double needle bar warp knitting machine realizing fast pattern loading provided by Example 1. Referring to FIG. 2, a shog controller of the control system of the double needle bar warp knitting machine should be provided with two or more than two high speed FIFO pattern data cache regions, and can realize a data read-write conversion function of each cache region continuously and automatically.

The method includes:

Shogging plan data of a novel pattern is calculated according to machine main cam-shaft position information and novel pattern data to be loaded. The shogging plan data of the novel pattern includes data of a resetting curve required during novel pattern loading and a shogging curve of the novel pattern.

The shog controller loads the novel pattern: the shogging plan data of the novel pattern is respectively written into the at least two data cache regions included in the shog controller.

The shog controller sends out a motion instruction to shog driving execution units of the warp knitting machine according to the shogging plan data in the data cache regions, so as to realize knitting continuously during novel pattern loading.

The operation of calculating the shogging plan data of the novel pattern according to the machine main cam-shaft position information and the novel pattern data to be loaded can be completed by a warp knitting machine control computer, or can also be completed by the shog controller.

When the above operation is completed by the warp knitting machine control computer, the warp knitting machine control computer calculates to obtain the shogging plan data of the novel pattern, and then sends the shogging plan data of the novel pattern to the shog controller; and the shog controller loads the novel pattern, including:

the shog controller writes the data of the resetting curve required during novel pattern loading into one cache region of the shog controller, and writes the data of the shogging curve of the novel pattern into the other cache region of the shog controller.

When the above operation is completed by the shog controller, the shog controller reads the machine main cam-shaft position information. The main cam-shaft position information includes a current position of each guide bar.

The control system of the warp knitting machine sends the novel pattern data to the shog controller. The novel pattern data includes a starting course position of the novel pattern.

The shog controller reads the target position of current shogging of an original pattern.

The shog controller calculates a shogging parameter required by each guide bar to transversely move to a novel pattern starting position according to the current position of each guide bar, the target position of the current shogging of the original pattern and the starting course position of the novel pattern, generates the resetting curve required during novel pattern loading according to a lapping interval allowed given by the control system of the warp knitting machine and the guide bar shogging rule requirements, and then, writes the data of the resetting curve into one cache region of the shog controller.

The shog controller calculates the data of the shogging curve of the novel pattern according to the novel pattern data, and writes the data into the other cache region of the shog controller.

The scheme of completing the operation of calculating the shogging plan data of the novel pattern according to the machine main cam-shaft position information and the novel pattern data to be loaded by the shog controller is illustrated below:

Through illustration by taking the shog controller including two data cache regions A and B as an example, after the end bit of the data in the cache region A is read, reading can be automatically switched to the starting bit of the cache region B. After the end bit of the data in the cache region B is read, reading can be automatically switched to the starting bit of the cache region A, and the operation is repeated in such a way.

The shog controller obtains a signal of main cam-shaft position and speed of the warp knitting machine through a main cam-shaft signal device, respectively calculates and plans the shogging plan data (stored in the pattern data cache regions of the control system of the warp knitting machine) of each guide bar according to the novel pattern data, sends out instruction information to the shog driving execution unit, and drives the corresponding guide bar to shogging respectively and precisely. The shogging plan data of the novel pattern of each guide bar is respectively stored in the two cache regions A and B.

Figure 1:
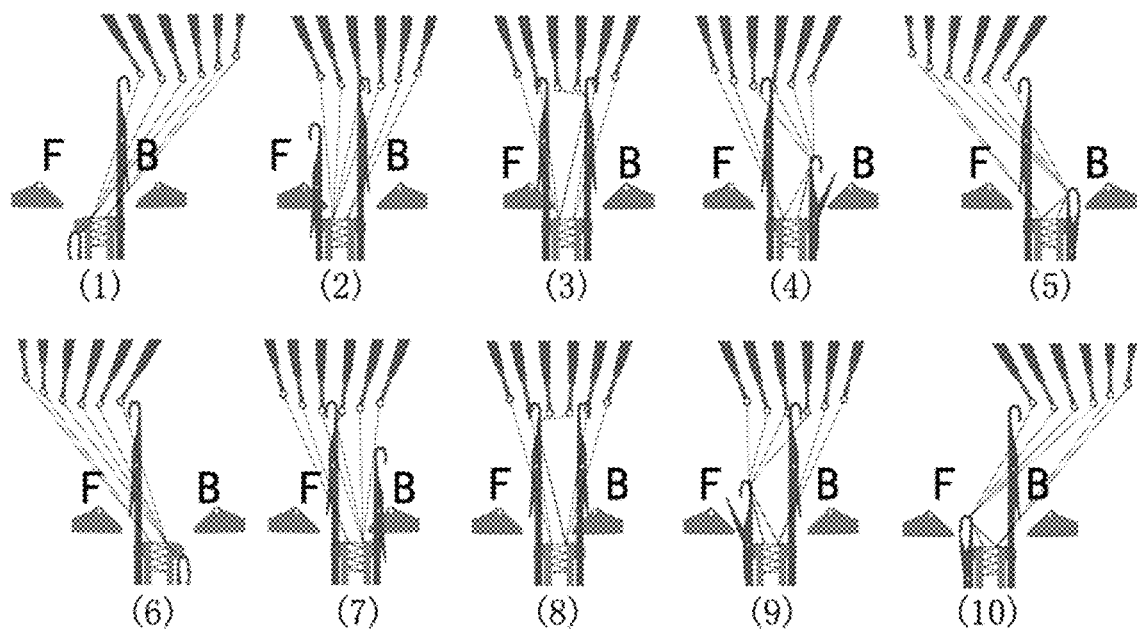
FIG. 1 is a schematic diagram of a knitting action of a high speed double needle bar warp knitting machine.

In order to ensure the uniformity and correctness of pattern data loading of the double needle bar warp knitting machine, during pattern loading, it is necessary that the main cam-shaft of the double needle bar warp knitting machine should be stopped at a position that all guide bars and guide needles thereon are in front of the needle hook side of the rear needle bar, i.e., an overlapping of the rear needle bar at this moment. And at this moment the front needle bar of the double needle bar warp knitting machine is in a lower position, and the rear needle bar is in the highest position, referring to a position near the position as shown in FIG. 1(1).

Figure 3:
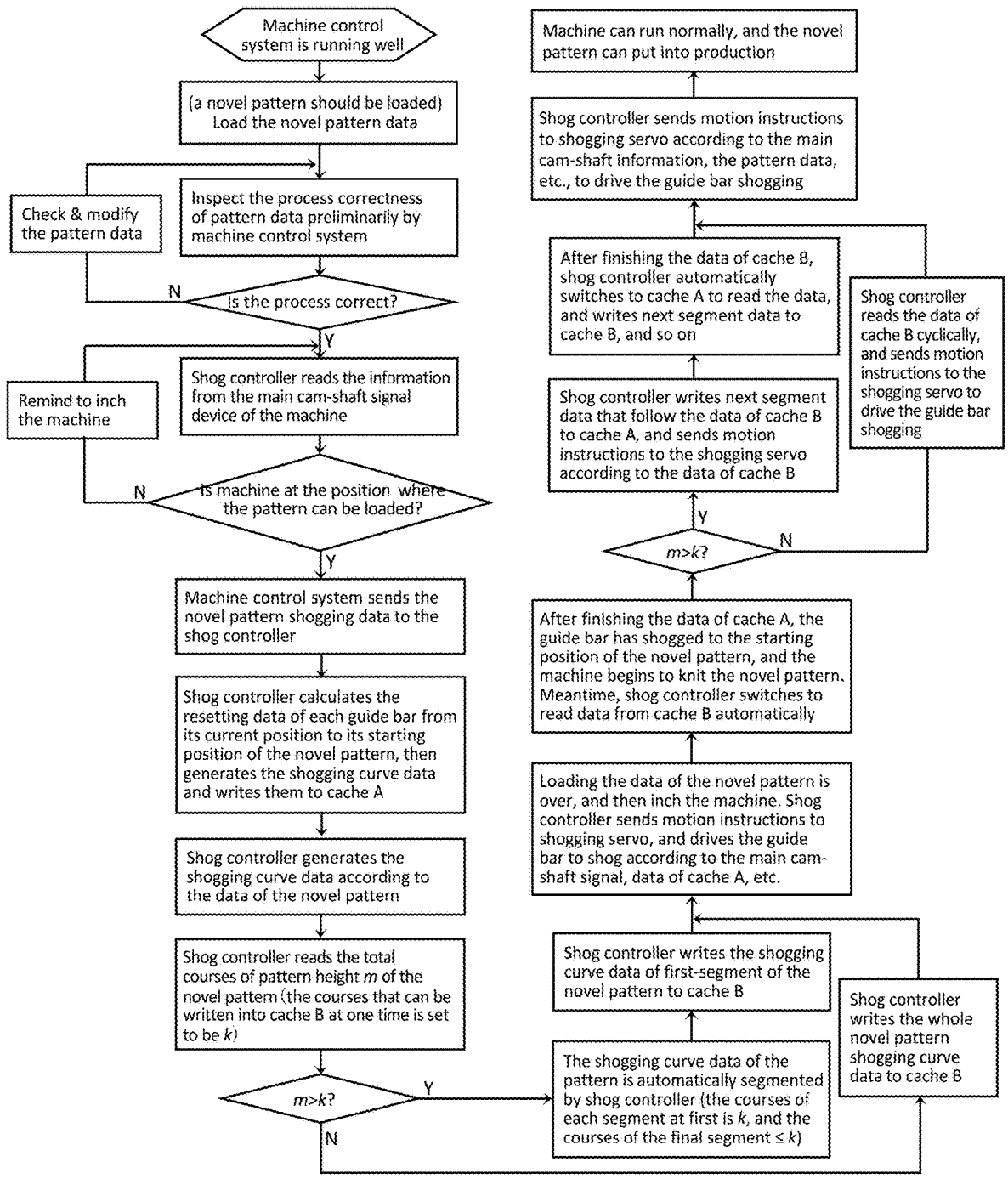
FIG. 3 is a schematic diagram of a pattern loading control flow chart of a double needle bar warp knitting machine.

As shown in FIG. 3, when the double needle bar warp knitting machine starts to load a novel pattern, and after the control system of the double needle bar warp knitting machine inputs a novel pattern file, firstly, the pattern file is subjected to process inspection, if there is any process problem, modification will be submitted until the process inspection is passed. Then, the control system of the double needle bar warp knitting machine will read the current main cam-shaft position information of the warp knitting machine, and detects whether the current main cam-shaft position of the warp knitting machine stops in a position suitable for loading pattern or not. If not, the control system will remind to inch the machine to the position slowly. For example, it is suitable for loading a pattern when the main cam-shaft position of the warp knitting machine is near the position as shown in FIG. 1(1), and other positions are unsuitable for loading a pattern.

After the current main cam-shaft position of the warp knitting machine stops in the position suitable for loading a pattern, the control system of the double needle bar warp knitting machine will send novel pattern data to the shog controller, and the shog controller performs internal processing of the shogging data in two parts: Part 1, the shog controller calculates a shogging parameter required by each guide bar to transversely move to a novel pattern starting position according to the current position of each guide bar, the target position of current shogging and the starting course position of the novel pattern, generates the resetting curve required during pattern loading according to the lapping interval allowed given by the control system of the warp knitting machine and the shogging rule requirements, and then, writes the data of the resetting curve into the cache region A of the shog controller.

Part 2, the shog controller writes the data of the shogging curve generated according to the novel pattern data into the cache region B of the shog controller. Here, the operation includes two conditions: Condition 1, when the total courses of the pattern height m of the novel pattern is smaller, and the converted data of the shogging curve can be written into the cache region B of the shog controller at one time (the courses of the pattern height that can be written into the cache region B of the shog controller at one time is set to be k), i.e., when m≤k, the data of the shogging curve generated from the whole pattern is written into the cache region B of the shog controller at one time.

Condition 2, when the total courses m of the novel pattern is greater, i.e., when m>k, the converted data of the shogging curve of the novel pattern needs to be segmented (the courses corresponding to the pattern height of each segment is k, and the pattern height of the final segment is ≤k), and only the data of the shogging curve generated from the first segment of pattern data is written into the cache region B of the shog controller.

Then, after writing of the data of the shogging curve of the novel pattern of the two cache regions is completed, inching buttons on the double needle bar warp knitting machine can put into use and receive an inching operation instruction, the main cam-shaft of the double needle bar warp knitting machine rotates (at this moment, the guide bars are in the overlapping position of the rear needle bar), the shog controller sends out overlap motion instruction information of the rear needle bar to shog driving execution units in an overlapping interval allowed of the rear needle bar of each guide bar, the corresponding guide bar is respectively driven to complete the overlapping of the rear needle bar.

During the guide bar swinging through the needles of rear needle bar to the needles of front needle bar, i.e., in the underlapping interval allowed of the front needle bar of each guide bar, the shog controller will continuously send underlap motion instruction information of the front needle bar to the shog driving execution unit, so as to respectively drive the corresponding guide bar to complete the underlap of the front needle bar. Hereto, the data of the resetting curve of the cache region A is completed, and the guide bar moves to the starting course position of the novel pattern.

Finally, after the guide bar swings through the needles of the front needle bar to its hook side, the shog controller automatically switches to read the cache region B, and the guide bar shogs according to the shogging plan data of the novel pattern, and the machine starts to knit the novel pattern. Herein includes:

Type 1, when the total courses m of the novel pattern is smaller (i.e., m≤k), the shog controller will cyclically read the pattern data of the cache region B, the guide bars are driven to shog by the shog driving execution units, and novel pattern loading is completed.

Type 2, when the total courses m of the novel pattern is greater (i.e., m>k), and only the data of the first segment of pattern data of the novel pattern is written into the cache region B, the shog controller will write the next segment of data of the shogging curve closely following the cache region B into the cache region A while reading the pattern data of the cache region B, and switching to the cache region A automatically is performed after the shog controller completes reading the pattern data in the cache region B. At this moment, the next segment of data of the shogging curve closely following the cache region A is written into the cache region B while reading the data of the shogging curve of the cache region A, and the operation is repeated in such a way. After the novel pattern loading is completed, the double needle bar warp knitting machine can put into normal production.

It should be noted that the present example is illustrated with the shog controller only including two cache regions. When the shog controller includes more cache regions, for example, includes five cache regions A, B, C, D and E, the shog controller calculates the shogging parameter required by each guide bar to transversely move to the novel pattern starting position according to the current position of each guide bar, the target position of current shogging of the original pattern and the starting course position of the novel pattern, generates the resetting curve required during novel pattern loading according to the lapping interval allowed given by the control system of the warp knitting machine and the guide bar shogging rule requirements, and then, writes the data of the resetting curve into the cache region A of the shog controller.

When m>k, the total courses m are divided into segments each with a length of k. The first segment is written into the cache region B of the shog controller, and the rest of the segments is sequentially written into the cache regions C, D and E.

If the cache regions B, C, D and E are still incapable of accommodating the data of the shogging curve generated from all of the pattern data, after the data of the resetting curve in the cache region A is read, the data of the shogging curve generated from the rest of the segments of pattern data is continuously written in the cache region A. After the data of the shogging curve in the cache regions B, C, D and E is sequentially read, the data of the shogging curve generated from the rest of the segments of pattern data is sequentially written into the cache regions B, C, D and E, and cyclically and repeated writing is performed until all of the data of the shogging curve generated from all of the pattern data is written into the cache regions.

According to the control method of pattern loading for the double needle bar warp knitting machine provided by the disclosure, through disposing two or more than two high speed FIFO pattern data cache regions on the shog controller of the control system of the double needle bar warp knitting machine, the data read-write conversion function of each cache region continuously and automatically is respectively realized. According to the current position of each guide bar, the target position of current shogging of the original pattern and the starting course target position of the novel pattern, the shog controller automatically calculates the shogging displacement required by each guide bar in the pattern loading process by the control system of the double needle bar warp knitting machine, and sends out instruction information to the shog driving execution unit corresponding to each guide bar. In the respective underlapping interval allowed of each guide bar, the corresponding guide bar is respectively driven by the shog driving execution unit to respectively and precisely move to the starting course position of the novel pattern to complete the electronic shogging pattern loading. Needle collision caused by guide bar shogging during pattern loading is avoided. The problem of complicated pattern loading operation of the high speed double needle bar warp knitting machine is solved. The transmission mechanism of the rear needle bar does not need to be dismounted, so that the pattern loading convenience of the double needle bar warp knitting machine is improved, and the work reliability and production efficiency of the double needle bar warp knitting machine are greatly improved.

End of Example 2

Some of the steps in the examples of the disclosure may be implemented through software, and corresponding software programs may be stored in a readable storage medium, such as an optical disk or a hard disk.

The foregoing descriptions are merely preferred examples of the disclosure, and are not intended to limit the disclosure. Any modification, equivalent substitution, improvement and the like made within the spirit and principle of the disclosure shall fall within the protection scope of the disclosure.

What is claimed is:

1. A method of using a control system of a warp knitting machine, the control system comprising:
a shog controller, wherein the shog controller comprises at least two data cache regions;
wherein when the control system carries out pattern loading, the control system is configured to calculate shogging plan data of a pattern according to machine main cam-shaft position information and the pattern, and the shogging plan data comprise data of a resetting curve required during pattern loading and data of a shogging curve of the pattern;
wherein the shog controller is configured to load the pattern by writing the shogging plan data respectively into the at least two data cache regions; and
wherein the shog controller is configured to send out a motion instruction to guide bar shog driving execution units of the warp knitting machine according to the shogging plan data in the at least two data cache regions;

the method comprising:
calculating the shogging plan data of the pattern according to the machine main cam-shaft position information and the pattern;
loading the pattern by the shog controller by writing the shogging plan data respectively into the at least two data cache regions; and
sending out the motion instruction by the shog controller to the shog driving execution units of the warp knitting machine according to the shogging plan data in the at least two data cache regions;
wherein the calculating of the shogging plan data comprises using a warp knitting machine control computer to calculate the shogging plan data and to send the shogging plan data to the shog controller; and
wherein the loading of the pattern by the shog controller comprises:
writing, by the shog controller, the data of the resetting curve into a first data cache region of the at least two data cache regions, and writing the data of the shogging curve into a second data cache region of the at least two data cache regions.

2. The method according to claim 1, wherein m is a total number of courses of the pattern and k is a number of pattern courses capable of being written into the second data cache region of the at least two data cache regions;
when m≤k, writing the data of the shogging curve into the second data cache region of the at least two data cache regions; and
when m>k, dividing the data of the shogging curve into segments, and writing a first segment of the segments into the second data cache region of the at least two data cache regions.

3. The method according to claim 2, wherein each of the segments other than a last segment of the segments has k pattern courses and the last segment of the segments has at most k pattern courses.

4. The method according to claim 3, wherein when m>k, a segment is written into any one data cache region of the at least two data cache regions only when no data were previously written into that any one data cache region or data previously written into that any one data cache region have been read by the shog controller.

5. The method according to claim 4, wherein the method further comprises:
inputting a pattern file into the control system, and performing process inspection on the pattern file.

6. The method according to claim 5, wherein the method further comprises:
when a main cam-shaft of the warp knitting machine is at a position unsuitable for loading the pattern, reminding an operator to inch the warp knitting machine.

7. A method of using a control system of a warp knitting machine, the control system comprising:
a shog controller, wherein the shog controller comprises at least two data cache regions;
wherein when the control system carries out pattern loading, the control system is configured to calculate shogging plan data of a pattern according to machine main cam-shaft position information and the pattern, and the shogging plan data comprise data of a resetting curve required during pattern loading and data of a shogging curve of the pattern;
wherein the shog controller is configured to load the pattern by writing the shogging plan data respectively into the at least two data cache regions; and
wherein the shog controller is configured to send out a motion instruction to guide bar shog driving execution units of the warp knitting machine according to the shogging plan data in the at least two data cache regions;

the method comprising:
calculating the shogging plan data of the pattern according to the machine main cam-shaft position information and the pattern;
loading the pattern by the shog controller by writing the shogging plan data respectively into the at least two data cache regions; and
sending out the motion instruction by the shog controller to the shog driving execution units of the warp knitting machine according to the shogging plan data in the at least two data cache regions;
wherein the calculating of the shogging plan data comprises:
reading the machine main cam-shaft position information by the shog controller, wherein the main cam-shaft position information comprises a current position of each guide bar of the warp knitting machine;
sending data of the pattern by the control system to the shog controller, wherein the data of the pattern comprise a starting course position for the pattern;
calculating, by the shog controller, amounts of transverse movement of the guide bars according to current positions thereof and the starting course position for the pattern, generating the data of the resetting curve according to a lapping interval allowed given by the control system and guide bar shogging rule requirements, and then, writing the data of the resetting curve into a first data cache region of the at least two data cache regions; and
calculating the data of the shogging curve by the shog controller according to the pattern, and writing the data of the shogging curve into a second data cache region of the at least two data cache regions.

* * * * *